United States Patent
Kwon et al.

(10) Patent No.: US 8,638,376 B2
(45) Date of Patent: Jan. 28, 2014

(54) IMAGE SENSOR FOR REDUCING KICK-BACK NOISE AND IMAGE PICK-UP DEVICE HAVING THE SAME

(75) Inventors: Min Ho Kwon, Seoul (KR); Seog Heon Ham, Suwon-si (KR); Dong Hun Lee, Yongin-si (KR); Kwi Sung Yoo, Seoul (KR); Wun-Ki Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 449 days.

(21) Appl. No.: 12/656,008

(22) Filed: Jan. 13, 2010

(65) Prior Publication Data

US 2010/0177220 A1 Jul. 15, 2010

(30) Foreign Application Priority Data

Jan. 13, 2009 (KR) .......................... 10-2009-0002542

(51) Int. Cl.
*H04N 5/217* (2011.01)
*H04N 5/228* (2006.01)
*H04N 3/14* (2006.01)

(52) U.S. Cl.
USPC .......................... 348/241; 348/300; 348/222.1

(58) Field of Classification Search
USPC ...................... 348/241, 299, 300, 222.1, 302; 341/126, 155
See application file for complete search history.

(56) References Cited

U.S. PATENT DOCUMENTS

| | | | |
|---|---|---|---|
| 6,433,822 B1 * | 8/2002 | Clark et al. | 348/241 |
| 6,445,320 B1 * | 9/2002 | Noro et al. | 341/155 |
| 6,577,258 B2 | 6/2003 | Ruha et al. | |
| 7,221,397 B1 * | 5/2007 | Kochi | 348/310 |
| 7,227,570 B2 * | 6/2007 | Sato et al. | 341/155 |
| 7,466,111 B2 * | 12/2008 | Komaki | 323/224 |
| 7,479,916 B1 * | 1/2009 | Reshef et al. | 348/308 |
| 2005/0184895 A1 | 8/2005 | Petersen et al. | |
| 2009/0079856 A1 * | 3/2009 | Yahazu | 348/294 |
| 2009/0128653 A1 * | 5/2009 | Tanaka | 348/222.1 |

FOREIGN PATENT DOCUMENTS

| | | |
|---|---|---|
| JP | 2006-333053 A | 12/2006 |
| KR | 10-2004-0037216 A | 5/2004 |
| KR | 10-2008-0007713 A | 1/2008 |

\* cited by examiner

*Primary Examiner* — Nhan T Tran
(74) *Attorney, Agent, or Firm* — Lee & Morse, P.C.

(57) ABSTRACT

An image sensor comprises a plurality of pixel units connected to a column line, a signal process circuit configured to process a signal output from the column line according to a switching operation, and a kick-back noise blocking circuit configured to reduce kick-back noise caused by the switching operation. Each of the pixel units includes a photoelectric conversion element. The kick-back noise blocking circuit is connected between the column line and the signal process circuit.

16 Claims, 7 Drawing Sheets

IMAGE SENSOR FOR REDUCING KICK-BACK NOISE AND IMAGE PICK-UP DEVICE HAVING THE SAME

BACKGROUND

1. Field

Embodiments relate to a semiconductor device, and more particularly, to an image sensor capable of reducing kick-back noise and an image pick-up device including the image sensor.

2. Description of the Related Art

In a CMOS image sensor, there is a problem in that switching noise is generated during a process of converting an analog signal output from a pixel unit to a digital signal through an oversampling method, and is transferred to the pixel unit as is.

SUMMARY

Embodiments are therefore directed to an image sensor capable of reducing kick-back noise and an image pick-up device including the image sensor, which substantially overcome one or more of the problems due to the limitations and disadvantages of the related art.

It is therefore a feature of an embodiment to provide an image sensor comprising: a plurality of pixel units connected to a column line, each of the pixel units including a photoelectric conversion element; a signal process circuit configured to process a signal output from the column line according to a switching operation; and a kick-back noise blocking circuit configured to reduce kick-back noise caused by the switching operation, the kick-back noise blocking circuit connected between the column line and the signal process circuit.

The kick-back noise blocking circuit may be a resistor.

Alternatively, the kick-back noise blocking circuit may be a MOSFET configured to operate in a linear region in response to a gating voltage input to a gate of the MOSFET.

The signal process circuit may comprises: a correlated double sampling circuit configured to perform correlated double sampling of an analog signal output from the kick-back noise blocking circuit according to a switching signal; and an analog to digital converter configured to convert a signal output from the correlated double sampling circuit to a digital signal.

Alternatively, the signal process circuit comprises: an analog to digital converter configured to convert an analog signal output from the kick-back noise blocking circuit to a digital signal according to the switching operation; and a correlated double sampling circuit configured to perform correlated double sampling of the digital signal output from the analog to digital converter.

The analog to digital converter may comprise a sigma-delta modulator and a digital filter.

Alternatively, the analog to digital converter may comprise a sigma-delta modulator and a digital filter.

Alternatively, the analog to digital converter may be a sigma-delta switched-capacitor.

Alternatively, the analog to digital converter is a sigma-delta switched-capacitor.

It is therefore a feature of an embodiment to provide an image pick-up device comprising: an image sensor; and a processor configured to control an operation of the image sensor, wherein the image sensor comprises: a plurality of pixels connected to a column line, each of the pixel units including a photoelectric conversion element; a signal process circuit configured to process a signal output from the column line according to a switching operation; and a kick-back noise blocking circuit configured to reduce kick-back noise caused by the switching operation, the kick-back noise blocking circuit connected between the column line and the signal process circuit.

The kick-back noise blocking circuit may a resistor or a MOSFET configured to operate in a linear region in response to a gating voltage input to a gate of the MOSFET.

The signal process device may comprise a sigma-delta analog to digital converter connected to the kick-back noise blocking circuit.

The signal process circuit may comprise: a correlated double sampling circuit configured to perform correlated double sampling of a signal output from the kick-back noise blocking circuit according to a switching signal; and an analog to digital converter configured to convert a correlated double sampled analog signal output from the correlated double sampling circuit to a digital signal.

Alternatively the signal process circuit may comprise: an analog to digital converter configured to convert an analog signal output from the kick-back noise blocking circuit to a digital signal according to the switching operation; and a correlated double sampling circuit configured to perform correlated double sampling of the digital signal output from the analog to digital converter.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
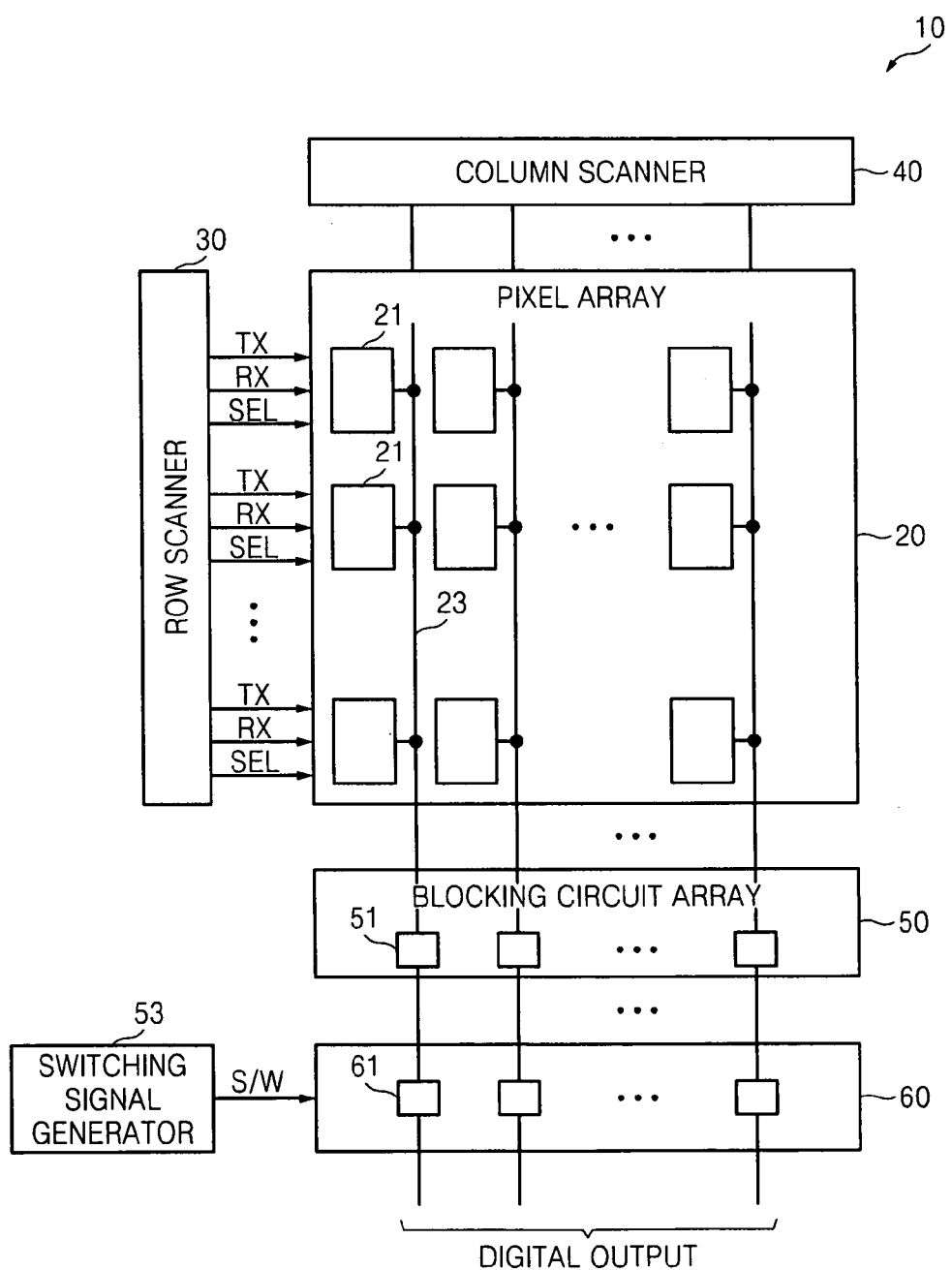
FIG. 1 illustrates a schematic block diagram of an image sensor according to an exemplary embodiment.

Korean Patent Application No. 10-2009-0002542, filed on Jan. 13, 2009, in the Korean Intellectual Property Office, and entitled: "Image Sensor for Reducing Kick-Back Noise and Image Pick-Up Device Having the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected to" other element, it can be connect directly to the other element, or one or more intervening elements may also be present. Further, it will be understood that when an element is referred to as being "connected between" two elements, it can be the only element between the two elements, or one or more intervening elements may also be present. Like reference numerals refer to like elements throughout.

FIG. 1 illustrates a schematic block diagram of an image sensor according to an exemplary embodiment. Referring to FIG. 1, an image sensor 10 used as an example of an image pick-up device or an image capture device may include a pixel array 20, a row or vertical scanner 30, a column or horizontal scanner 40, a kick-back noise blocking circuit array 50, and a signal process circuit array 60. The signal process circuit array 60 may be configured to process an analog signal output from the kick-back noise blocking circuit array 50 according to a switching operation or a sampling operation. More specifically, the signal process circuit array 60 may be configured to perform at least one of an analog to digital converting operation and a correlated double sampling operation according to a switching operation or a sampling operation.

The image sensor 10 may further include a switching signal generator 53 configured to generate at least one switching signal S/W for controlling a switching operation or a sampling operation of the signal process circuit array 60. The image sensor 10 may be manufactured through a CMOS process. The pixel array 20 may include a plurality of pixel units 21 arranged in two dimensions. For example, each of the pixel units 21 may include a photoelectric conversion element, for example, a photodiode, PD and four transistors as illustrated in FIGS. 2 through 6.

Four transistors are illustrated in FIGS. 2 through 6 for brief explanation of the embodiments. However, the number of transistors in the pixel unit 21 is not restricted to four.

In each column line 23, pixel units 21 may be connected to each other. Each of the pixel units 21 may include a photoelectric conversion element PD, a transfer transistor, a reset transistor, a floating diffusion node FD, a drive transistor, and a pixel selection transistor. The photoelectric conversion element PD may generate and accumulate photo-generated charge by converting incident light to an electric signal. An anode of the photoelectric conversion element PD is connected to a ground VSS, and a cathode is connected to the transfer transistor.

The transfer transistor may transmit a photo-generated charge generated in the photoelectric conversion element PD to the floating diffusion node FD in response to a gating signal TX. The reset transistor may reset the floating diffusion node FD in response to a reset signal RX. The drive transistor may perform a role of a source follower in response to a voltage of the floating diffusion node FD. The pixel selection transistor may output an electric signal generated from the pixel unit 21 in response to a selection signal SEL.

The row or vertical scanner 30 extended in a column (vertical) direction of the pixel array 20 may generate a plurality of control signals TX, RX, and SEL to drive each of the plurality of pixel units 21. When an electronic shutter is operated and reads pixel unit signals, the plurality of pixel units 21 of the pixel array 20 may be scanned successively by the scanners 30 and 40.

The kick-back noise blocking circuit array 50 may include a plurality of kick-back noise blocking circuits 51. Each of the plurality of kick-back noise blocking circuits 51 may be connected between each column line 23 and each signal process circuit 61. Each of the kick-back noise blocking circuits 51 may prevent switching noise from being kicked-back to each pixel unit 21 through each column line 23. Switching noise may be generated during each switching operation or sampling operation. Here, kick-back means a phenomenon that switching noise influences a pixel unit, especially the floating diffusion node FD in the pixel unit. The signal process circuit array 60 may include a plurality of signal process circuits 61. Detailed operation of the plurality of signal process circuits 61 will be explained referring to FIGS. 2 through 6.

Figure 2:
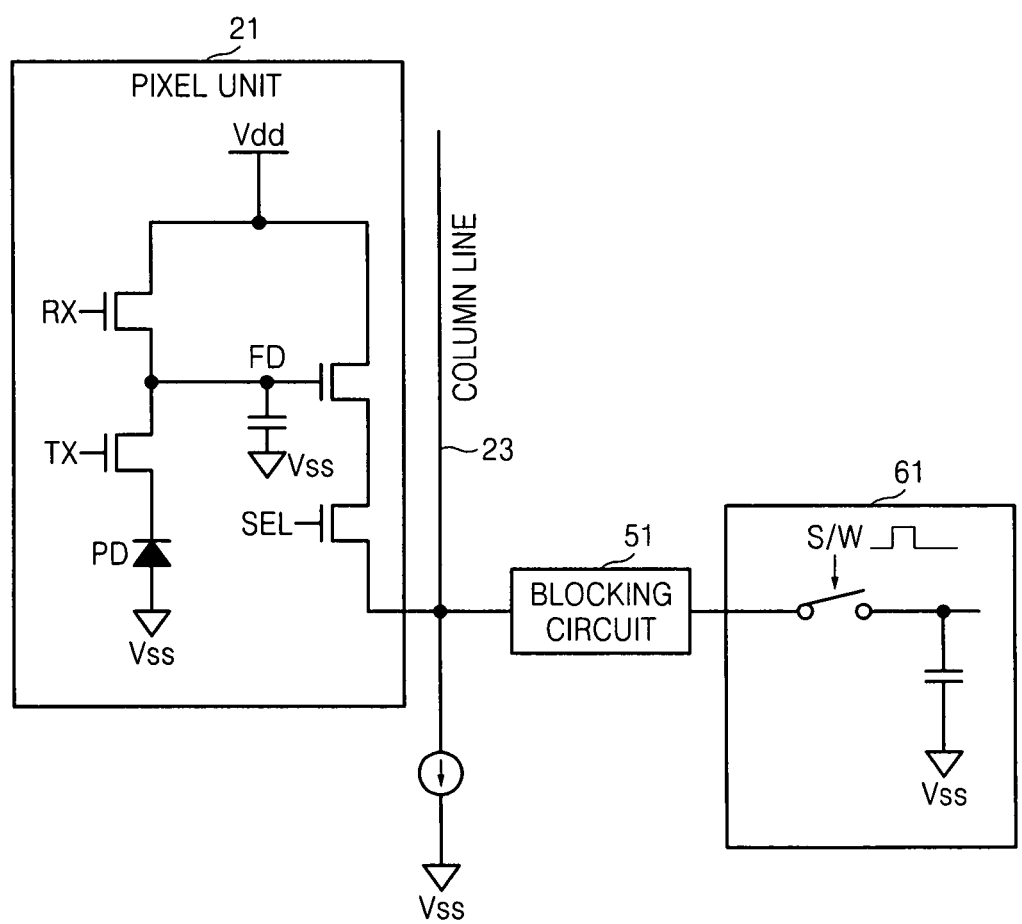
FIG. 2 illustrates a part of the image sensor configured to reduce kick-back noise according to an exemplary embodiment.

FIG. 2 illustrates a part of an image sensor configured to reduce kick-back noise according to an exemplary embodiment. Referring to FIG. 2, an analog signal, i.e., a reset signal or an image signal, is output through the column line 23 and the kick-back noise blocking circuit 51. A signal process circuit 61 may perform a sampling operation of the output analog signal. The sampling operation of the signal process circuit 61 may be performed by a switching operation according to a switching signal S/W.

Switching noise generated by the switching operation may be delivered to the pixel unit 21, especially the floating diffusion node FD, through the column line 23. This switching noise may be blocked or reduced by the kick-back noise blocking circuit 51. The embodiments of the kick-back noise blocking circuit 51 and the signal process circuit 61 will be discussed in detail with reference to FIGS. 3 through 6.

Figure 3:
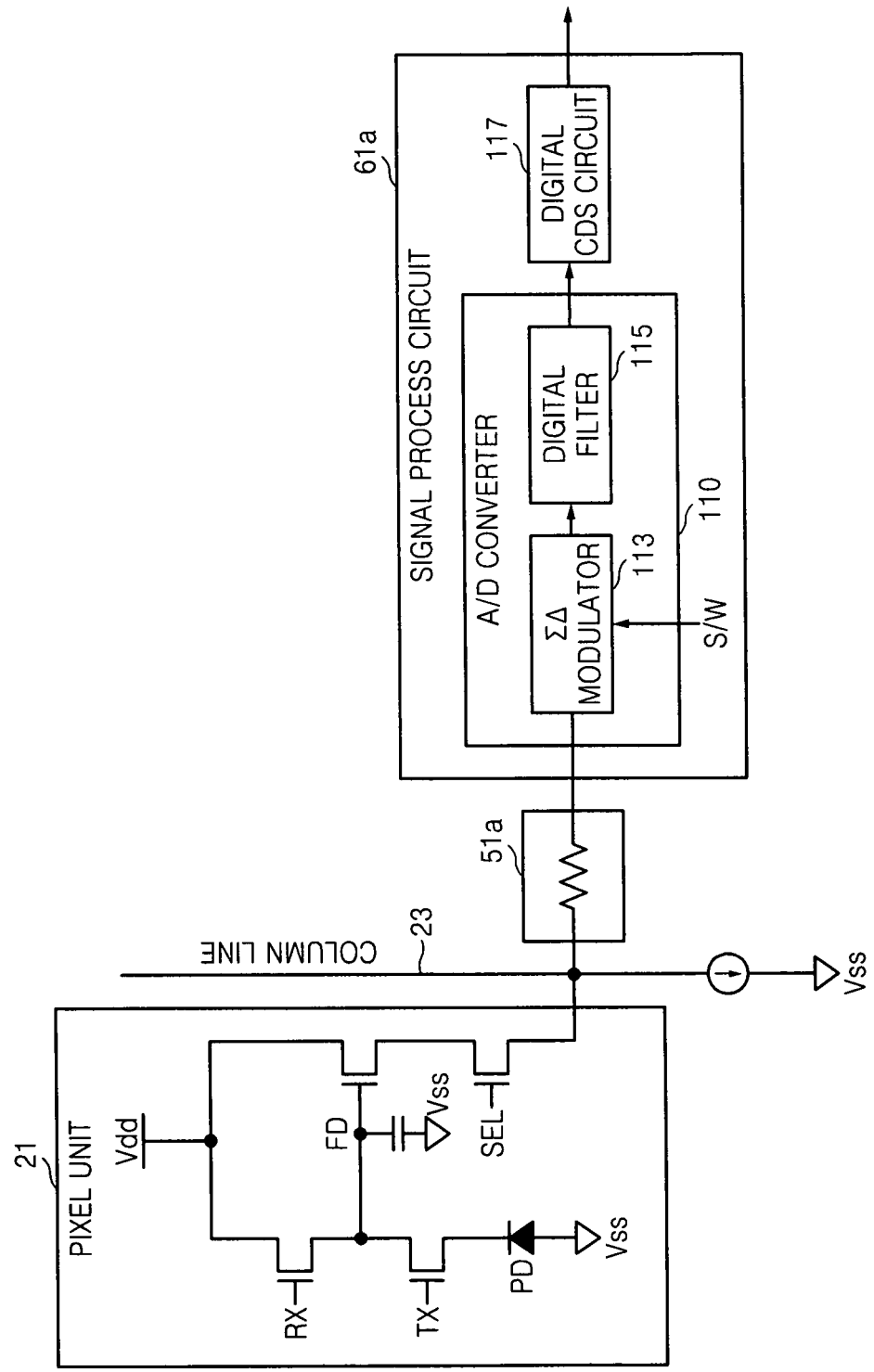
FIG. 3 illustrates a circuit diagram of the image sensor including a kick-back noise blocking circuit and a signal process circuit according to an exemplary embodiment.

FIG. 3 illustrates a circuit diagram of an image sensor including a kick-back noise blocking circuit 51a and a signal process circuit 61a according to an exemplary embodiment. The kick-back noise blocking circuit 51a in FIG. 3 may be a resistor. As a resistance value of the kick-back noise blocking circuit 51a increases, kick-back noise delivered to the floating diffusion node FD may decrease.

The signal process circuit 61a may include an analog to digital converter 110 and a digital correlated double sampling circuit 117. The analog to digital converter 110 may be configured to convert an analog signal output from the kick-back noise blocking circuit 51a to a digital signal. The digital correlated double sampling circuit 117 may be configured to perform correlated double sampling of the digital signal output from the analog to digital converter 110. The analog to digital converter 110 may include a sigma-delta modulator 113 and a digital filter 115. The analog to digital converter 110 may be a sigma-delta analog to digital converter.

The sigma-delta modulator 113 may include at least a switch, and may convert an analog signal to a digital signal in response to at least a switching signal S/W. The sigma-delta modulator 113 is also called a delta-sigma modulator. The sigma-delta modulator 113 may be embodied as an inverter-used switched-capacitor circuit.

A digital filter 115 or a decimator may sample information from an N-bit data stream (N is a real number equal to 1 or 1.5) output from the sigma-delta modulator 113, and may reduce a data transfer rate into a useful value. For example, the digital filter 115 may calculate an average value of a 1-bit data stream.

Figure 4:
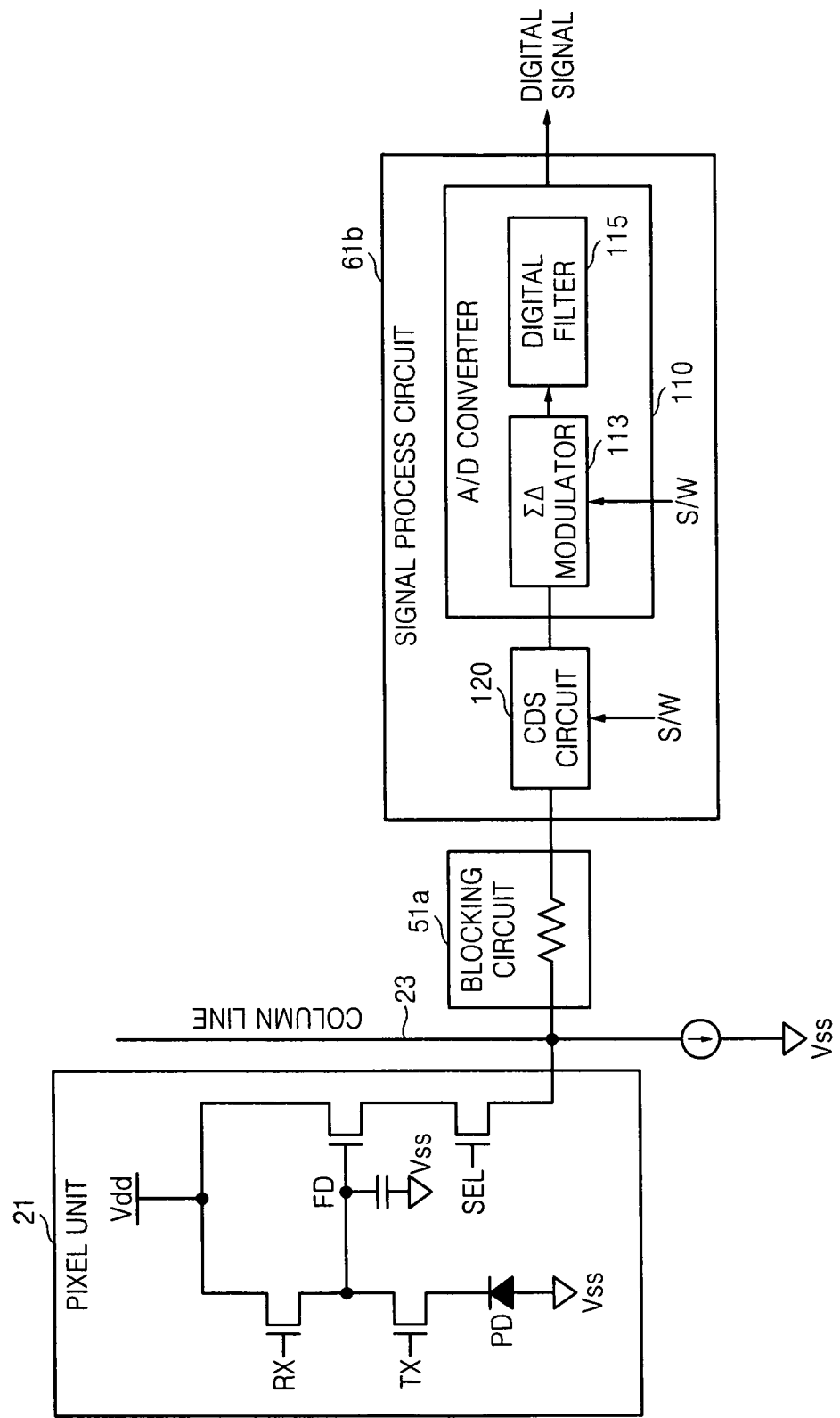
FIG. 4 illustrates a circuit diagram of the image sensor including a kick-back noise blocking circuit and the signal process circuit according to another exemplary embodiment.

FIG. 4 illustrates a circuit diagram of an image sensor including the kick-back blocking circuit 51a and a signal process circuit 61b according to another exemplary embodiment. The kick-back noise blocking circuit 51a of FIG. 4 may be a resistor.

The signal process circuit 61b may include the correlated double sampling circuit 120 and the analog to digital converter 110. The correlated double sampling circuit 120 may perform correlated double sampling of a reset signal and an image signal generated by the pixel unit 21, and may output a correlated double sampled signal through the column line 23 and the kick-back noise blocking circuit 51a. Here, the correlated double sampling circuit 120 may be a switched-capacitor circuit. The correlated double sampling circuit 120 may perform a correlated double sampling operation in response to at least a switching signal S/W.

The analog to digital converter 110 may convert the correlated double sampled signal to a digital signal. As explained above referring to FIG. 3, the analog to digital converter 110 may include the sigma-delta modulator 113 and the digital filter 115. Alternatively, the analog to digital converter 110 may be a sigma-delta analog to digital converter.

Figure 5:
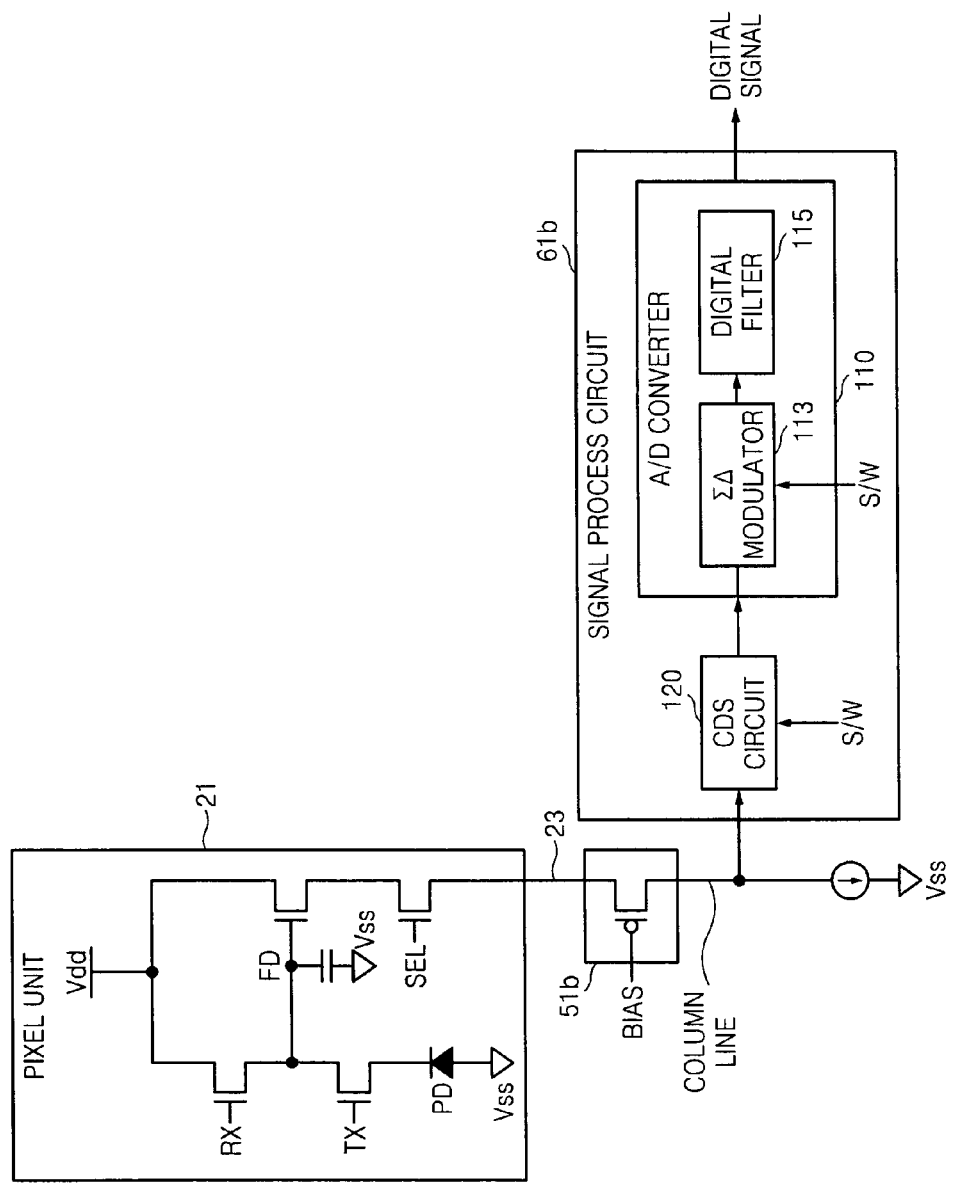
FIG. 5 illustrates a circuit diagram of the image sensor including a kick-back noise blocking circuit and a signal process circuit according to another exemplary embodiment.

FIG. 5 illustrates a circuit diagram of an image sensor including a kick-back noise blocking circuit 51b and the signal process circuit 61b according to another example embodiment.

The kick-back noise blocking circuit 51b may include a MOSFET. According to the embodiment, when the kick-back noise blocking circuit 51b includes a PMOSFET, a gate of the PMOSFET may operate in a linear region by being connected to the ground. Alternatively, when the kick-back noise blocking circuit 51b includes a NMOSFET according to the embodiment, a gate of the NMOSFET may operate in a linear region by being connected to a power source, e.g., Vdd.

In other words, when the kick-back noise blocking circuit 51b includes as a MOSFET, a bias voltage or a gating voltage BIAS may be supplied to a gate of the MOSFET, and thus, the MOSFET may operate in a linear region. Here, an image sensor may further include a bias voltage generator (not shown) configured to generate a bias voltage BIAS.

The signal process circuit 61b illustrated in FIG. 5 may be substantially the same as the signal process circuit 61b illustrated in FIG. 4.

Figure 6:
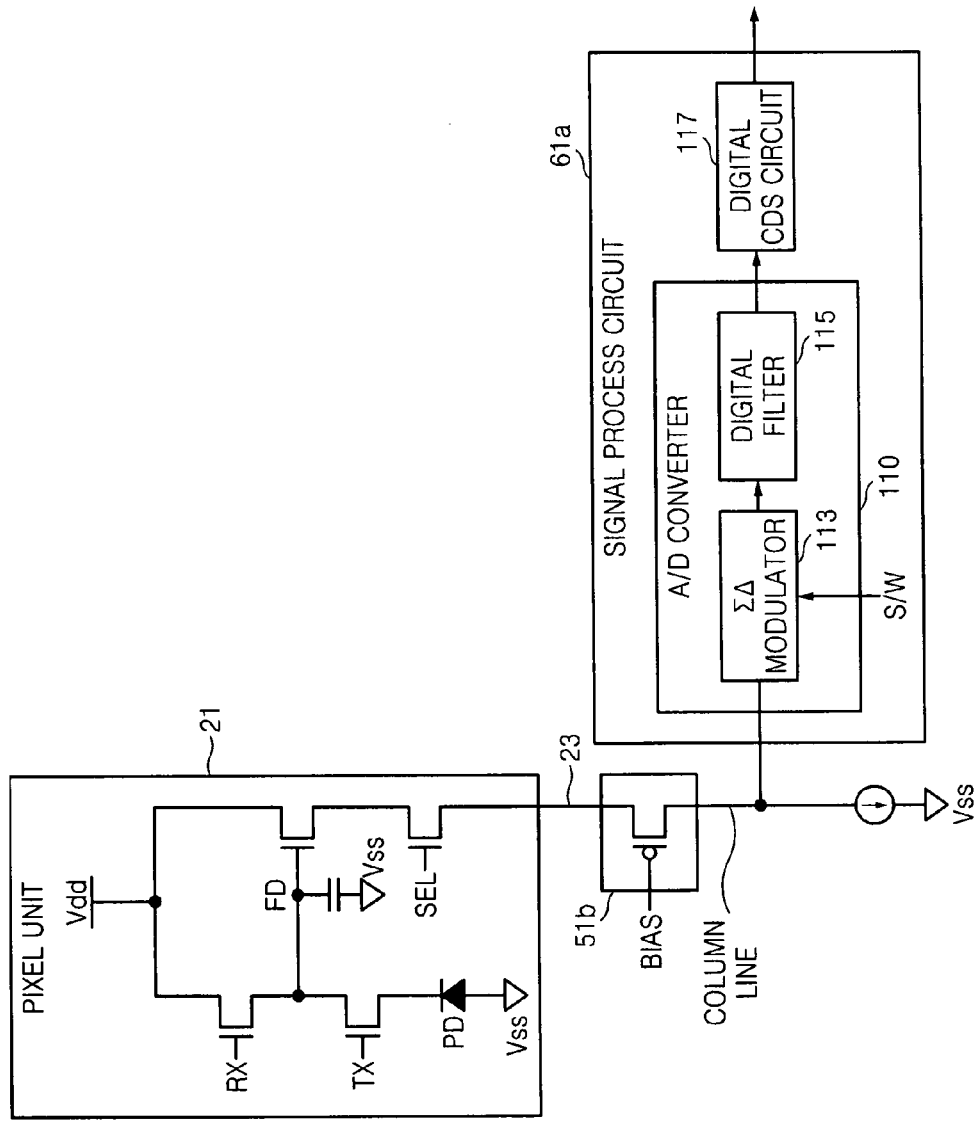
FIG. 6 illustrates a circuit diagram of the image sensor including a kick-back noise blocking circuit and a signal process circuit according to another exemplary embodiment.

FIG. 6 illustrates a circuit diagram of an image sensor including the kick-back noise blocking circuit 51b and the signal process circuit 61a according to another example embodiment. The kick-back noise blocking circuit 51b illustrated in FIG. 6 may have substantially the same structure and operation as the kick-back noise blocking circuit 51b illustrated in FIG. 5.

Additionally, the signal process circuit 61a illustrated in FIG. 6 may be embodied substantially the same as the signal process circuit 61a illustrated in FIG. 3. As explained above referring to FIGS. 1 through 6, the kick-back noise blocking circuit 51 may reduce or cancel the phenomenon that switching noise generated by a switching operation or a sampling operation of the signal process circuit 61 is kicked-back to the pixel unit 21, particularly, a floating diffusion node FD through a column line 23.

Figure 7:
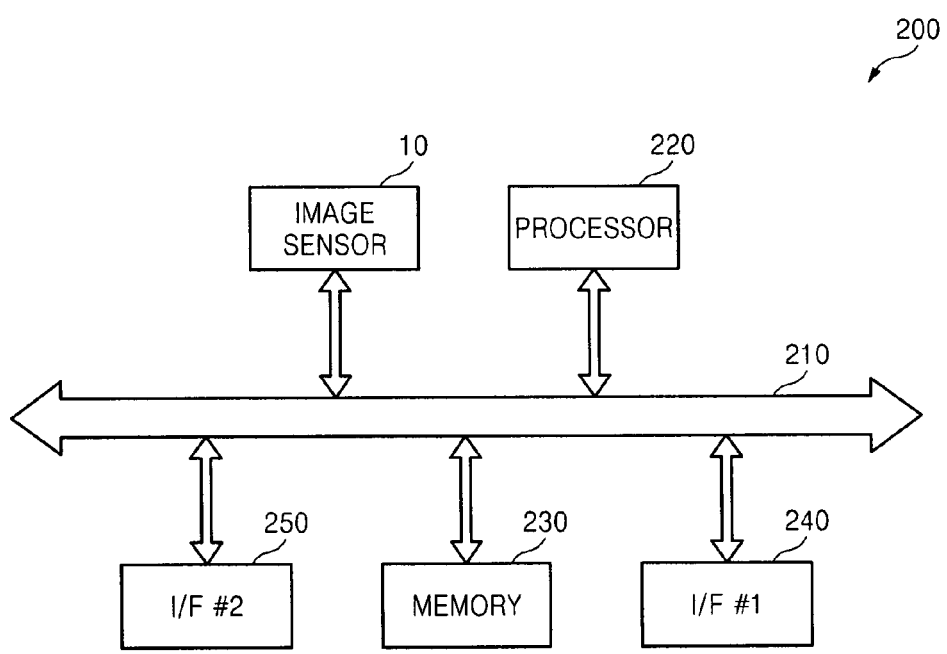
FIG. 7 illustrates a block diagram of an image pick-up device including the image sensor according to an exemplary embodiment.

FIG. 7 illustrates a block diagram of an image pick-up device including an image sensor according to an exemplary embodiment. Referring to FIG. 7, as an image process system, an image pick-up device 200 may include an image sensor 10, a processor 220, and a memory device 230. The image sensor 10 may be connected through a system bus 210. The image pick-up device 200 may also include at least one of a first interface 240 and a second interface 250.

The processor 220 may control an image sensing operation of the image sensor 10. The processor 220 may control a signal converting operation. More specifically, the processor 220 may control at least one of an analog to digital converting operation and a correlated double sampling operation. The processor 220 may also control an operation of storing image data captured by the image sensor 10 in the memory device 230.

The processor 220 may control a data write operation or a data read operation of the memory device 230 overall. The processor 220 may control operations of reading data stored in the memory device 230 and transmitting the read data to the outside through the first interface 240 like an input/output interface or an operation of storing data input from the outside through the first interface 240 in the memory device 230.

Additionally, the processor 220 may control operations of reading data stored in the memory device 230 and transmitting the read data to the outside by radio through the second interface 250 like a wireless interface or an operation of storing data input by radio from the outside through the second interface 250 in the memory device 230.

The image pick-up device 200 may be a portable apparatus. The portable apparatus may be a digital camera, a portable communication device having a built-in image sensor 10, e.g., personal digital assistants PDA, a cellular telephone, or a portable multimedia player PMP. Alternatively, the portable apparatus may be an automotive navigation system having a built-in image sensor 10, or a satellite system having a built-in image sensor 10.

An image sensor according to the embodiments and an image pick-up device including the image sensor may effectively reduce or cancel the phenomenon that switching noise generated during a sampling operation is kicked-back to a pixel unit.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. An image sensor, comprising:
   a plurality of pixel units connected to a column line, each of the pixel units including a photoelectric conversion element and a floating diffusion node;
   a signal process circuit configured to process a signal output from the column line according to a switching operation; and
   a kick-back noise blocking circuit configured to adjust a resistance value of the kick-back noise blocking circuit to reduce kick-back noise generated by the switching operation from being kicked back from the signal process circuit to the floating diffusion node of each of the pixel units through the column line, the kick-back noise blocking circuit coupled between the column line and the signal process circuit.

2. The image sensor as claimed in claim 1, wherein the signal process circuit comprises:
   a correlated double sampling circuit configured to perform correlated double sampling of an analog signal output from the kick-back noise blocking circuit according to a switching signal; and
   an analog to digital converter configured to convert a signal output from the correlated double sampling circuit to a digital signal.

3. The image sensor as claimed in claim 2, wherein the analog to digital converter comprises a sigma-delta modulator and a digital filter.

4. The image sensor as claimed in claim 2, wherein the analog to digital converter is a sigma-delta switched-capacitor.

5. The image sensor as claimed in claim 1, wherein the signal process circuit comprises:

an analog to digital converter configured to convert an analog signal output from the kick-back noise blocking circuit to a digital signal according to the switching operation; and a correlated double sampling circuit configured to perform correlated double sampling of the digital signal output from the analog to digital converter.

6. The image sensor as claimed in claim 5, wherein the analog to digital converter comprises a sigma-delta modulator and a digital filter.

7. The image sensor as claimed in claim 5, wherein the analog to digital converter is a sigma-delta switched-capacitor.

8. The image sensor as claimed in claim 1, wherein the kick-back noise delivered to the floating diffusion node depends on a resistance value of the kick-back noise blocking circuit.

9. An image pick-up device, comprising:
an image sensor; and
a processor configured to control an operation of the image sensor,
wherein the image sensor comprises:
a plurality of pixel units connected to a column line, each of the pixel units including a photoelectric conversion element and a floating diffusion node;
a signal process circuit configured to process a signal output from the column line according to a switching operation; and
a kick-back configured to adjust a resistance value of the kick-back noise blocking circuit to reduce kick-back noise generated by the switching operation from being kicked back from the signal process circuit to the floating diffusion node of each of the pixel units through the column line, the kick-back noise blocking circuit coupled between the column line and the signal process circuit.

10. The image pick-up device as claimed in claim 9, wherein the signal process device comprises a sigma-delta analog to digital converter connected to the kick-back noise blocking circuit.

11. The image pick-up device as claimed in claim 9, wherein the signal process circuit comprises:

a correlated double sampling circuit configured to perform correlated double sampling of a signal output from the kick-back noise blocking circuit according to a switching signal; and an analog to digital converter configured to convert a correlated double sampled analog signal output from the correlated double sampling circuit to a digital signal.

12. The image pick-up device as claimed in claim 9, wherein the signal process circuit comprises:
an analog to digital converter configured to convert an analog signal output from the kick-back noise blocking circuit to a digital signal according to the switching operation; and
a correlated double sampling circuit configured to perform correlated double sampling of the digital signal output from the analog to digital converter.

13. An image sensor, comprising:
a plurality of pixel units connected to a column line, each of the pixel units including a photoelectric conversion element and a floating diffusion node;
a sigma-delta analog to digital converter configured to convert an analog signal output from the column line to a digital signal according to at least a switching signal; and
a kick-back noise blocking circuit configured to adjust a resistance value of the kick-back noise blocking circuit to reduce kick-back noise generated based on the switching signal form being kicked back from the sigma-delta analog to digital converter to the floating diffusion node of each of the pixel units through the column line, the kick-back noise blocking circuit coupled between the column line and the sigma-delta analog to digital converter.

14. The image sensor as claimed in claim 13, wherein the sigma-delta analog to digital converter comprises a sigma-delta modulator and a digital filter.

15. The image sensor as claimed in claim 13, wherein the sigma-delta analog to digital converter is a sigma-delta switched-capacitor.

16. The image sensor as claimed in claim 13, wherein the image sensor further comprises:
a correlated double sampling circuit configured to perform correlated double sampling of the digital signal output from the sigma-delta analog to digital converter.

* * * * *